April 11, 1961 J. W. VDOVIAK 2,978,870
FUEL INJECTOR FOR A COMBUSTION CHAMBER
Filed Dec. 26, 1957
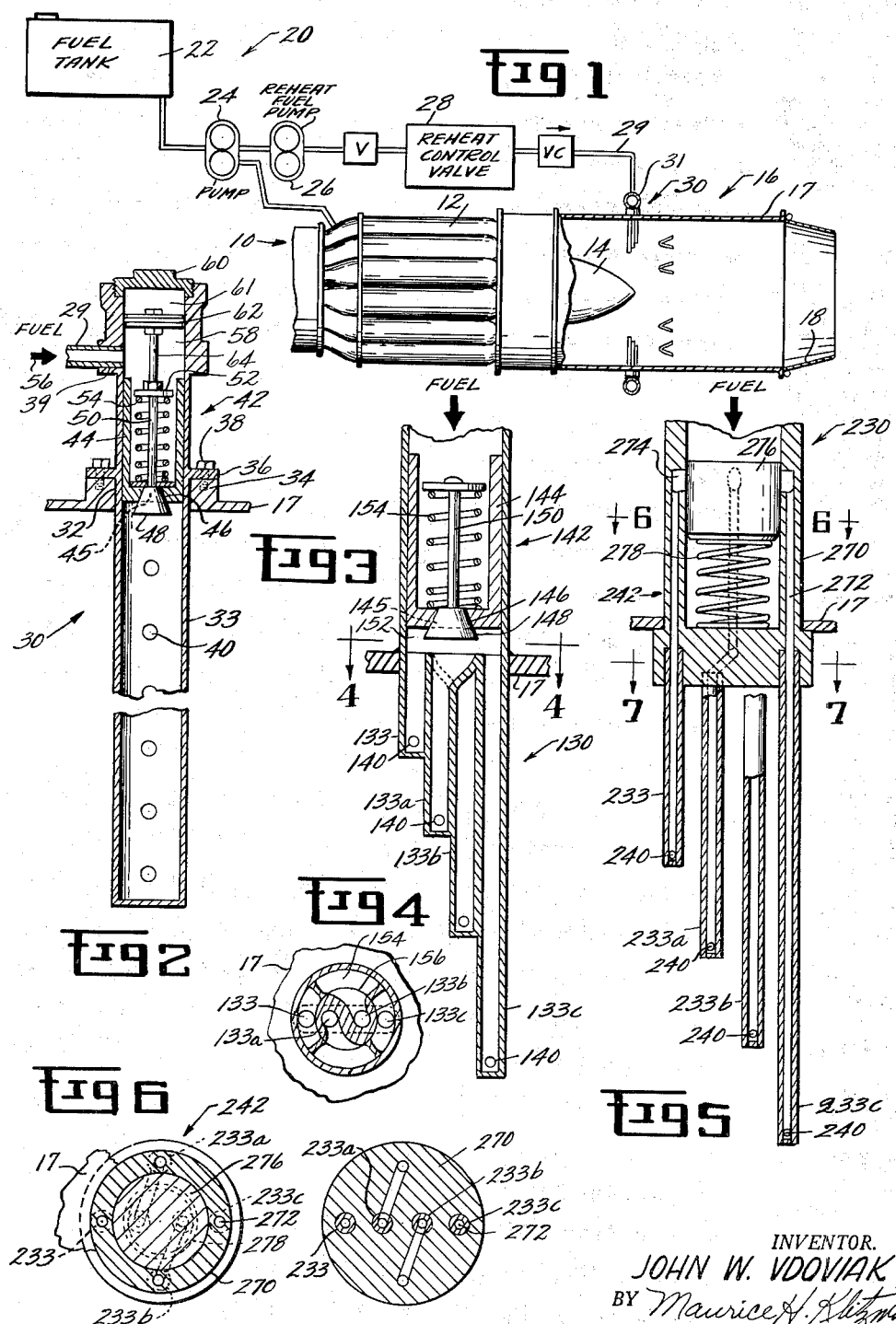
INVENTOR.
JOHN W. VDOVIAK
BY Maurice H. Klitzman
ATTORNEY United States Patent Office 2,978,870
Patented Apr. 11, 1961

2,978,870
FUEL INJECTOR FOR A COMBUSTION CHAMBER

John W. Vdoviak, Cincinnati, Ohio, assignor to General Electric Company, a corporation of New York Filed Dec. 26, 1957, Ser. No. 705,266

2 Claims. (Cl. 60—39.74)

This invention relates to a fuel injector for a combustion chamber for a gas turbine engine, and in particular, to a wide flow range spray bar assembly for injecting fuel into a combustion chamber of an aircraft gas turbine engine.

In an aircraft gas turbine engine, air passes through a compressor where it is compressed, and then passes into a combustor where fuel is added by a main fuel system for the combustion process. The hot gases then pass downstream through a turbine which is designed to take sufficient energy out of the hot gases for driving the compressor. If the engine is a turbo jet, the hot gases then pass through an exhaust nozzle where the remaining energy in the gases provides thrust for the engine. Since the turbine cannot withstand extremely high temperatures, temperature of the hot gases coming out of the combustion chamber must be limited. Therefore, complete burning is undesirable. As a result, a large amount of unburned gases pass out through the exhaust nozzle to the atmosphere. The unburned gases represents available energy for more thrust.

Therefore, in order to obtain more thrust from an aircraft gas turbine engine, with a minimum amount of weight penalty, it has been common to attach an afterburner to the turbine frame to burn the unburned gases. An afterburner is merely an additional combustion chamber for an additional combustion process. Since a large amount of unburned gas passes through the turbine, the afterburner is provided with fuel from a reheat fuel system to mix with the unburned gases for the additional combustion. For purposes of this invention a reheat fuel system is intended to cover a fuel system which is in addition to the main fuel system and is operated only during afterburner operation. Stoichiometric combustion is one in which an exact amount of fuel and air is chemically combined to make the combustion reaction complete. In order to obtain the most efficient burning it is important that the combustion process be near stoichiometric, for example, in afterburners. However, in combustion chambers, where gas velocities are very high, gas flows large, and the combustion process near stoichiometric, conventional types of injection nozzles cannot be effectively employed. This is particularly true in the afterburners of aircraft gas turbine engines and in some annular combustion chambers of the main combustion system in aircraft gas turbine engines. Present fuel injectors do not effectively mix the fuel with air to obtain near stoichiometric combustion. The conventional types of fuel injection systems cannot satisfactorily provide the wide flow range required for the high fuel flow rate, high pressure condition and for the moderately low fuel flow rate, low pressure condition. If the fuel injection system is designed for maximum thrust producing conditions, (high flow rate, and high temperatures) it will not be efficient for the low thrust condition (low flow rate, and low temperatures). During high Mach flight, the temperature of the fuel, before it enters the afterburner, may be in the order of 225° F. Therefore, the minimum allowable fuel pressure to suppress fuel boiling is high. At low flow rates the pressure is not sufficient to maintain the fuel above its boiling point. If a fuel system were used where a single manifold and single set of spray bars forms the fuel system, the orifices must be designed for the maximum flow condition. When this is done, the pressures become exceedingly low at minimum flow. Since the temperature of the incoming gases in the afterburner is high, and since the pressure of the fuel is not sufficiently high, a boiling problem results. Also, at the low pressure condition, a maldistribution of fuel to the various orifices results since the pressure is not sufficiently great to provide the same flow to the orifices in the spray bars located at the top of the combustion chamber as compared to the orifices in the spray bars at the bottom of the combustion chamber.

In an attempt to provide a fuel system capable of injecting fuel into a combustion chamber over a wide range of operating conditions, for example, high fuel flow rates and stoichiometric burning as well as low fuel flow rates with low temperatures, present day systems use what is commonly referred to as a duplex reheat fuel system. Such a prior art system is found in application Serial No. 513,260 filed June 6, 1955, and assigned to the same assignee as this application. In such duplex reheat fuel systems, two sets of fuel injection nozzles are provided which extend into the combustion chambers. The two sets of fuel injection nozzles are interconnected in parallel by a flow divider which normally operates one set of nozzles at minimum flow and both sets at high flows and high pressure. In such systems, spray bars are generally used instead of conventional fuel injection nozzles, since the spray in the shape of a cone from a conventional fuel nozzle would be immediately collapsed in the 900–1000 ft./sec. flow stream, which is common in afterburner diffusers. Previous methods have attempted to insure controllable fuel distribution by using the simple spray bar arrangement in a duplex system.

The spray bar is simply an elliptical or circular tube which is placed in the diffuser section of the combustion chamber normal to the axis of the engine. It has a series of small holes along its length so arranged that generally the fuel is injected into the air stream prependicularly to the stream in the spray bar. A series of these spray bars are interconnected by a manifold and are placed around the inside of the afterburner in numbers varying from 20 to 40 in number and project radially inwardly. With possibly ten holes per spray bar and approximately 40 spray bars, a total of 400 individual points of fuel injection are obtained with which fuel distribution may be obtained. Furthermore, the point at which the fuel may be injected into the gas stream is generally found experimentally by adjusting or by simply relocating the holes to conform with a particular combustion chamber mass flow distribution. The mass flow distribution across a combustion chamber is not uniform. This is due to the flow in the combustion chamber being maldistributed. In the case of an afterburner, the flow of hot gases coming from the turbine has some turbulence. However, the flow distribution can be measured experimentally by inserting pressure probes at a plurality of radial locations. A greater number of orifices for injecting fuel into the stream will be concentrated in the area where the mass flow distribution is determined to be the greatest. Therefore, maximum combustion efficiency can be attained only by painstakingly matching and adjusting the spray bar hole pattern to the particular gas stream mass flow distribution.

Prior duplex reheat systems have inherent difficulties operating over wide range operating conditions. The orifices in the spray bars are designed to have a flow characteristic equivalent to that of a simple orifice, that is, the flow varies as the square root of the differential pressure. Therefore, to obtain a fuel flow range of 10 to 1, typical in present afterburners, a pressure range of 100 to 1 is necessary. This pressure range requires an exceedingly large fuel pump. Also, the flow range requirements for future afterburners is steadily increasing. Further, orifices in the spray bars of duplex systems are used to meter the flow. The pressure drop across these orifices are high and the corresponding total orifice area is small. Therefore, in order to obtain good fuel distribution, it is necessary to provide a large number of points of fuel injection. As a result, very small holes are required which are difficult to machine. Also a spray bar with many small fixed orifices does not have wide flow range capabilities. Further, the small orifices in spray bars of a duplex system in the secondary manifold, have the tendency to coke and gum when not in use. Since these openings can become plugged quite frequently, it necessarily results in poor performance.

The above duplex reheat fuel systems are not only complex and heavy but also have inherent operational shortcomings. Duplex systems generally use flow dividers to switch in or cut out the secondary flow system. When the flow divider cracks for the secondary system to barely open, the flow in the second system is at low pressure so that the flow does not distribute equally to all points in the secondary manifold. This problem results since the spray bars at the bottom of the combustion chamber receive more flow than the spray bars at the top.

In its mode of operation, the duplex system works in opposition to the combusition requirements of an aircraft gas turbine. That is, at the high altitude, low pressure and low fuel flow conditions, where the combustion problems are the worst and the need for complete fuel distribution is the most urgent, such a system is operating only on the primary leg of the duplex system with the smallest number of spray bars. This is not satisfactory since the fuel is not being effectively distributed in the afterburner.

In addition, a fuel boiling problem is created with the duplex system during low pressure conditions in the secondary manifold when the flow divider barely cracks. By the time this relatively low pressure fuel reaches the orifices in the secondary manifold, the high ambient temperatures will create boiling. Therefore, high pressure requirements to prevent fuel boiling at low flow rates is a necessity which has not been met by the present day duplex reheat fuel systems.

Another type of fuel injection nozzle that has been used is the variable area fuel injection nozzle. This is a nozzle that has moving parts to vary the orifice area and thereby provide a wide fuel flow range. However, such a fuel injection nozzle has poor reliability in a high temperature environment in view of the differential thermal expansions of the moving parts. Such nozzles also create large obstructions in the high velocity gas stream and create undesirably large pressure losses. Spraybars, on the other hand, provide less blockage area to the high velocity stream, and therefore less pressure loss or pressure drop.

It is well known in prior art fuel systems to provide check valves between the fuel injectors in the combustion chamber and the fuel pump. These are generally used to prevent the escape of fuel into the combustion chamber when the fuel system is not in operation, or to prevent back flow of gasses into the fuel system. However, these check valves are not positioned in such a manner to equally distribute the flow to the fuel injectors. The fuel injectors at the bottom of the combusiton chamber receive more fuel than the fuel injectors at the top.

It is therefore a general object of this invention to provide a fuel injection system for the combustion chamber of an afterburner in an aircraft gas turbine engine, in which the fuel injection system utilizes one set of spray bars rather than two sets as in duplex systems, and the orifices in the spray bars are enlarged so as to have a low pressure drop and act as distributing orifices rather than metering orifices, and means are located outside of the combustion chamber associated with each of the spray bars so as to insure substantially equal distribution of fuel to the spray bars during high flow as well as low flow conditions in a high ambient temperature.

It is another general object of this invention to circumvent the fixed orifice law of a fuel injector where the flow varies with the square of the pressure, by incorporating a variable area orifice means outside of a hot gas stream and injecting fuel into the gas stream by at least one fixed distributing orifice positioned in the gas stream, and making the fixed orifices relatively large with a small pressure drop in order that the variable orifice means control the metering of the fuel irrespective of the fixed orifice.

It is an object of this invention to provide a wide flow range spray bar for a combusiton chamber positioned in a high velocity gas stream while maintaining fuel passing through the spraybar in a liquid state, with the portion of the spraybar in the stream occupying a minimum of area so as not to create large pressure losses, and locating pressure sensitive valve means in another portion of the spraybar not subjected to the high velocity gas stream.

It is another object of this invention to provide a fuel injection system for a combusiton chamber for obtaining wide fuel flow range, which system includes a plurality of spray bars having fuel injecting orifices located at different radii of the combustion chamber, and means are provided to equally distribute the fuel to the fuel injecting orifices.

It is a further object of this invention to provide a plurality of spraybars for use in injecting fuel into a combustion chamber, with each of the spraybars being in the form of a plurality of tubes extending into the combustion chamber to different radial points and a pressure sensitive valve arrangement capable of distributing the fuel equally to the tubes.

It is still a further object of this invention to provide a spraybar assembly comprising a plurality of tubes extending into a combustion chamber, and pressure sensitive valve means in series with each of the tubes to simultaneously and equally distribute fuel to the tubes over a wide range of flow conditions in a relatively narrow pressure range.

It is still another further object of this invention to provide a fuel injection system capable of injecting fuel equally into a plurality of spraybar assemblies over a wide flow range, and thereafter to equally distribute the flow to a plurality of orifices positioned at different radii in a combustion chamber.

Briefly stated, and, in accordance with one aspect of this invention, a fuel injection system is provided for injecting fuel into a combusition chamber at a number of radial points over a wide range of operating conditions, in a high ambient temperature normally sufficient to boil the fuel, the fuel injecting system including spraybars with orifices positioned at different radial locations with respect to the combustion chamber, the orifices distributing the fuel in the combustion chamber, while the metering of fuel to the orifices being accomplished by a valving arrangement positioned outside of the combustion chamber to maintain the fuel under sufficient pressure to prevent the boiling and accomplish equal fuel distribution among the spraybars.

These and other objects will become more apparent when read in the light of the accompanying specification and drawing wherein the parts are referred to specifically, but are intended to be applied as generically as the prior art will permit, wherein:

Figure 1 shows the aft end of a gas turbine engine with a typical fuel supplying system which could be used in connection with this invention.

Figure 2 is a cross sectional view of a single tube arrangement in combination with a valve arrangement in accordance with one embodiment of the invention.

Figure 3 is a cross sectional view of the fuel injector or multiple tube spray bar assembly in combination with a means for distributing the fuel to the tubes simultaneously.

Figure 4 is a cross sectional view taken on lines 4—4 of Figure 3.

Figure 5 is a cross sectional view of the multiple tube spray bar assembly in combination with means for supplying fuel to the tubes equally as well as simultaneously.

Figure 6 is a cross sectional view taken on lines 6—6 of Figure 5.

Figure 7 is a cross sectional view taken on lines 7—7 of Figure 5.

Referring to Figure 1 a typical reheat system is shown merely by way of example in combination with the afterburner of an aircraft gas turbine engine. However, it is recognized that the invention could be used with any combustion chamber. The aft end of the aircraft gas turbine is generally referred to by the numeral 10 having a combustion chamber 12, exhaust cone 14 and an afterburner or combustion chamber generally referred to by the numeral 16. The afterburner 16 includes an afterburner casing 17 and an afterburner exhaust nozzle 18.

In order to obtain more thrust from the engine, a reheat fuel system 20 is shown for supplying fuel to the afterburner 16 so as to mix with the unburned air in the hot gases passing from the main combustion system for additional burning. The fuel system 20 includes a fuel tank 22 and main fuel pump 24 for delivering fuel to the main combustion system. A reheat fuel pump 26, a reheat control valve 28, and a conduit 29 is provided for delivering fuel to a manifold 31 which interconnects a plurality of spray bar assemblies or fuel injectors 30 for ejecting fuel into the afterburner 16. Any number of spray bar assemblies or fuel injectors may be used in order to provide satisfactory performance. However, only one of these will be described and it is understood that the others are similar.

Reference is now made to Figure 2, in which a fuel injector is provided in accordance with this invention. An opening 32 is provided in the afterburner casing 17 for receiving the fuel injector or spray bar assembly 30. The spray bar assembly consists of a low pressure loss inducing tubular member 33 positioned in the opening 32 having a portion extending radially into the afterburner or combustion chamber 16. A boss 34 is provided on the casing 17 to receive a shoulder 36. Screws 38 or the like are provided for securing the shoulder 36 to the boss 34. An opening 39 is provided in the outer portion of the spray bar assembly 30 to receive the conduit 29 for the inlet of fuel. Fuel distributing orifices are shown at 40 and are positioned at the proper radial position to match the particular velocity profile. It is important to note that these orifices are not metering orifices in the normal sense of the term as used in the duplex reheat fuel system but are merely distributing orifices.

In order to meet the requirements for wide range fuel flow conditions so as to prevent the fuel from boiling under low pressure, and in order to supply the flow of fuel necessary for maximum operating conditions, a spring loaded pressure sensitive poppet valve assembly 42 is provided for each spray bar. The poppet valve assembly meters the fuel and is positioned in the outer portion of the tube 33 so as not to be exposed to the hot gases in the combustion chamber. The poppet valve assembly comprises a housing 44 provided with an opening 45 at one of its ends, the marginal edges of which contains a valve seat 46. A poppet 48 is provided for seating on the valve seat 46. The poppet 48 is provided with a stem 50 which has a nut and washer assembly 52 positioned at an end opposite to that of the poppet 48. The spring 54 is positioned between the nut and washer assembly 52 and one end of the housing 44 to normally bias the poppet 48 on the valve seat 46. The spring 54 is designed so as to maintain a substantial fuel pressure in the line without opening of the poppet. For example, a fuel pressure of 50 p.s.i.g. can be maintained as the spray bar head. This would be below a spring cracking pressure which can be set near 80 p.s.i.g. This arrangement will meter the flow from the inlet shown at 56 whenever the inlet pressure is above 80 p.s.i.g. and will distribute fuel equally, or substantially so, to the distributing orifices 40.

In order to provide greater stability to the poppet valve 48, a dashpot is shown at 58 formed by the piston 62. The piston 62 is connected to the poppet valve assembly 42 by the stem 64. A removable plug is shown at 60 and forms a dead end chamber 61 with the piston 62.

For afterburner operation, the reheat fuel pump is energized so as to supply fuel under pressure to the manifold 31, then to the pressure sensitive valve 42 and tube 33. The amount of pressure the reheat fuel pump is set to deliver will determine the opening of the poppet valve. The flow will be metered through the opening 45 when the pressure of the reheat fuel exceeds the spring cracking pressure. At relatively low thrust, on reheat operation, the poppet valve 48 will open a small amount permitting the fuel to be metered to the openings 40. Whenever a higher thrust is demanded so as to require the reheat fuel pump to operate at a higher pressure, the poppet valve 48 will open to a larger extent to permit a larger flow of fuel to the orifices 40. The orifices 40 are sufficiently large to permit large flows as well as low flows. As a result of this arrangement the pressure of the fuel in the manifold is always sufficiently great to prevent boiling of the fuel at low flows. The pressure of the fuel metered into the tube 33 will always be greater than the spring cracking pressure which can be set to occur above the boiling point for the low flow condition.

Referring now to Figures 3 and 4, another embodiment of the invention is disclosed for equally distributing fuel to a plurality of tubes of a spraybar. A spraybar assembly is shown at 130 which includes a plurality of tubes 133, 133a, 133b, and 133c extending into the combustion chamber. These tubes are of different lengths so as to radially position the distributing orifices 140 to properly coincide with the mass flow distribution of the gases in the afterburner. A poppet valve assembly is shown at 142 in the upper portion of the spray bar assembly which includes a housing 144 provided with an opening 145 having a valve seat 146 thereon. A poppet 148 is shown adapted to be seated in the valve seat and is provided with a stem 150. The stem has a nut and washer assembly at the end remote from the poppet and is held in that position by a spring 154 biased between the nut and washer assembly and the bottom of the housing 144. This spring normally biases the poppet valve to close position in the opening 145, so as to prevent the flow of fuel therethrough. A flow distributing chamber 152 receives fuel from the poppet valve assembly 142. The chamber distributes the fuel equally to the tubes by providing equal sectors 154, formed by partitions 156. Each of the sectors receive an equal amount of fuel for passage to the orifices 140 in each of the tubes. The orifices 140 are relatively large and provide for distribution rather than metering.

When the reheat fuel pump pressure becomes greater than the spring cracking pressure to open the poppet valve, the fuel will be metered through the opening 145 to each of the sectors 154 (see Fig. 4) and each of the tubes 133, 133a 133b, 133c, to the openings 140. The poppet valve assembly 142 will distribute the fuel to the tubes under sufficient pressure to prevent boiling of the fuel. Even at the low flow rate the fuel will still be maintained under sufficient pressure so as not to boil. The orifices 140 may vary in size to equalize the flow through each tube if the variable tube length has an effect on equal distribution at the sectors 154.

Referring now to Figures 5–7, a preferred embodiment of the invention is shown which discloses a valve means for providing equally distributed flow in the spray bar assembly to a number of conveying tubes, which in turn inject the fuel at the proper radial position in the combustion chamber to match the velocity profile of the afterburner. This is accomplished by the spray bar assembly 230 being provided with a plurality of tubes 233, 233a, 233b, and 233c extending into the combustion chamber. A plurality of distributing orifices 240 are shown which provide a means for injecting fuel into the combustion chamber. The tubes 233, 233a, 233b, and 233c are positioned at the proper radial location so that the distributing orifices 240 are also radially located to coincide with the mass flow distribution in the afterburner. A valve assembly is shown at 242 outside of the combustion chamber so as not to be exposed to the hot gases. This assembly includes a wall 270 in the spray bar assembly. The wall contains passageways 272 which are equal in number to the number of tubes. Ports 274 are provided in the wall 270 of the spray bar assembly. In order to obtain equal distribution in this valve arrangement, it is important that these openings be of the same size and at the same height to obtain equal and simultaneous distribution of the fuel. A valve body is shown at 276 which is spring biased by a spring 278, to normally close off the ports 274.

Whenever the reheat fuel pump creates a pressure sufficiently great to actuate the valve body against the pressure exerted by the spring 278 the ports 274 will be simultaneously opened and by an equal amount. Additional pressure would further uncover the ports simultaneously so as to provide the necessary flow area to accomplish the fuel flow range. Therefore, at low flow rates during afterburner operation an equal amount of flow would pass into each of the tubes 233, 233a, 233b, and 233c, with the fuel being under sufficient pressure so as not to boil. If greater thrust is required so that the reheat fuel pump delivers a greater pressure, the ports 274 will be uncovered to a greater extent to equally distribute the fuel to each of the tubes to operate at the high speed condition.

An advantage of the above spraybar arrangements, is the minimum blockage area to the high temperature, high velocity gas stream. The spray bar and pressure sensitive valve means are constructed so as to keep the pressure losses to a minimum. The valve means, which provide the metering function, is positioned outside of the combustion chamber, while the thin tube portion, which provides the distributing function, is positioned within the combustion chamber. Therefore, minimum pressure drop of the gas stream in addition to preventing the fuel from boiling in the spraybar is provided.

While particular embodiments of the invention have been illustrated and described, it will be obvious to those skilled in the art that various changes and modifications may be made without departing from the invention and it is intended to cover in the appended claims all such changes and modifications that come within the true spirit and scope of the invention.

What I claim as new and desire to secure by Letters Patent of the United States is:

1. In combination with a combustion chamber of generally circular section, means for injecting fuel into said combustion chamber comprising fuel supply means providing a source of fuel under pressure, a fuel manifold connected to receive fuel from said fuel supply means, a plurality of spray bar assemblies disposed in spaced relationship circumferentially of said combustion chamber, each said spray bar assembly including wall means defining a valve chamber disposed exteriorly of said combustion chamber and connected to receive fuel from said manifold, said wall means further defining a plurality of separate flow passages extending from said valve chamber into said combustion chamber and being of staggered lengths with their inner ends disposed in radially spaced relation within said combustion chamber, each said fuel flow passage having adjacent its inner end at least one discharge orifice relatively large in flow area so as to have small pressure drop, and spring loaded valve means disposed in said valve chamber operative to meter fuel flow from said manifold to said fuel flow passages so as to maintain manifold fuel pressures sufficient to prevent boiling of fuel in the manifold.

2. In combination with a combustion chamber, means for injecting fuel into said combustion chamber comprising fuel supply means providing a source of fuel under pressure, a fuel manifold connected to receive fuel from said fuel supply means, a plurality of spray bar assemblies disposed in spaced relationship about said combustion chamber, each said spray bar assembly including wall means defining a valve chamber disposed exteriorly of said combustion chamber and connected to receive fuel from said manifold, spring loaded valve means disposed in said valve chamber operative to meter fuel flow from said manifold, said valve means comprising a poppet and cooperating valve seat to meter the fuel flow therethrough, said spray bar wall means further defining fuel distribution means including a distribution chamber partitioned into sectors each open to said valve means to intercept a portion of the fuel flow therefrom and connecting to one of a plurality of separate flow passages extending into said combustion chamber, each said fuel flow passages having adjacent its inner end at least one distributing orifice opening into said combustion chamber.

References Cited in the file of this patent

UNITED STATES PATENTS

| | | |
|---|---|---|
| 2,606,066 | Thompson | Aug. 5, 1952 |
| 2,613,998 | Noon | Oct. 14, 1952 |
| 2,806,354 | Cook | Sept. 17, 1957 |